(No Model.)

C. W. HUNT.
FEED REGULATOR.

No. 438,377. Patented Oct. 14, 1890.

Witnesses
Chas. H. Smith
J. Staib

Inventor
Charles W. Hunt
per Lemuel W. Serrell
atty.

(No Model.)

C. W. HUNT.
FEED REGULATOR.

No. 438,377.

2 Sheets—Sheet 2.

Patented Oct. 14, 1890.

Witnesses
Chas H. Smith
J. Staib

Inventor
Charles W. Hunt
per Lemuel W. Serrell
atty

UNITED STATES PATENT OFFICE.

CHARLES W. HUNT, OF WEST NEW BRIGHTON, ASSIGNOR TO THE C. W. HUNT COMPANY, OF NEW YORK, N. Y.

FEED-REGULATOR.

SPECIFICATION forming part of Letters Patent No. 438,377, dated October 14, 1890.

Application filed February 10, 1890. Serial No. 339,815. (No model.)

*To all whom it may concern:*

Be it known that I, CHARLES W. HUNT, a citizen of the United States, residing at West New Brighton, in the county of Richmond and State of New York, have invented an Improvement in Measuring and Feed Regulators, of which the following is a specification.

Coal and other materials have been supplied by a chute or hopper into a coal-breaker, separator, or other device, but difficulty has arisen in overloading the coal breaker or separator by the continuous flow of the material into the same after the movement of the breaker or separator has been retarded or stopped.

My present invention is for regulating the supply of the material and stopping that supply whenever the breaker or similar machine is stopped; and it consists in the combination of devices hereinafter set forth and claimed.

Figure 1:
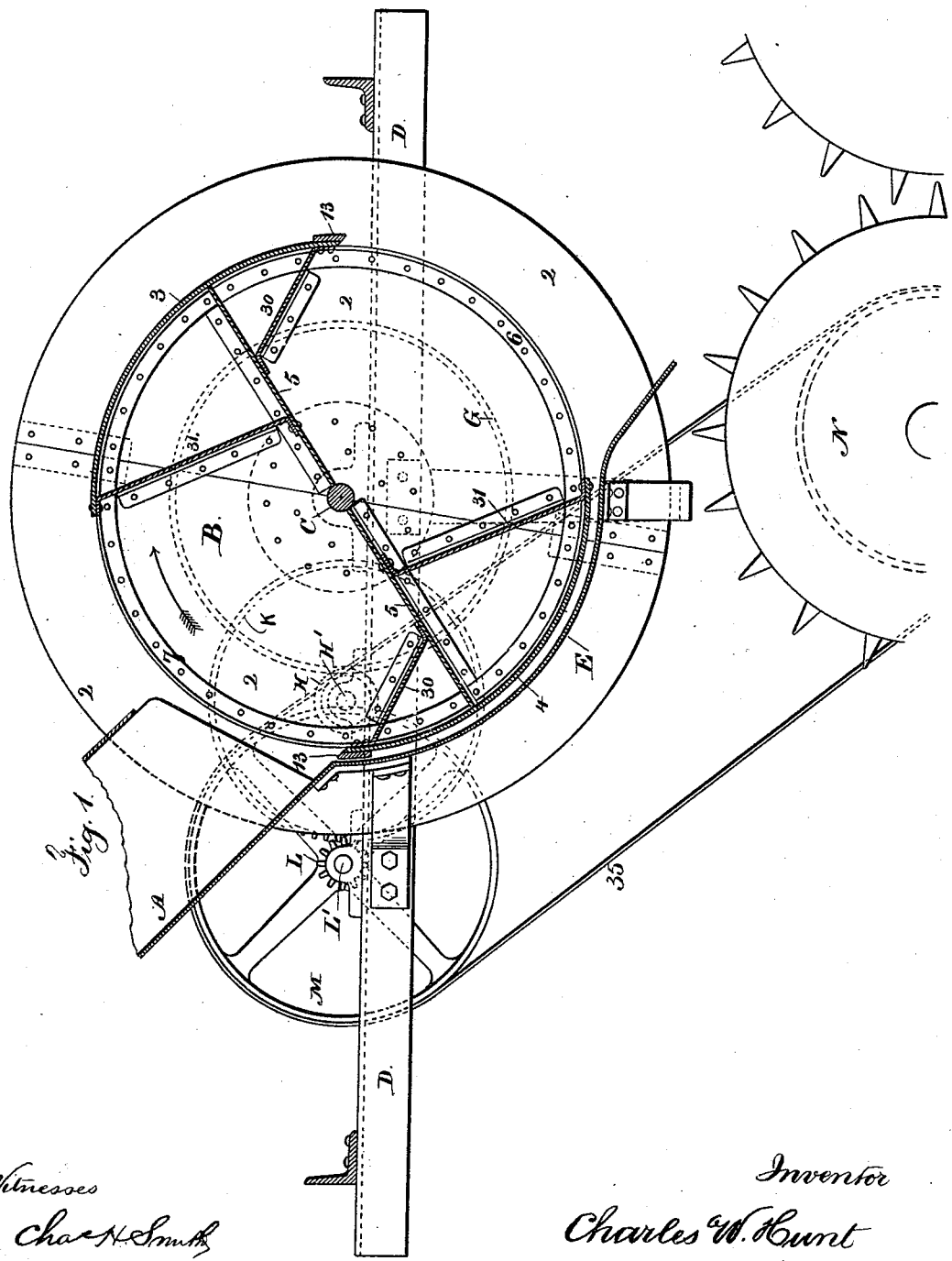
Figure 2:
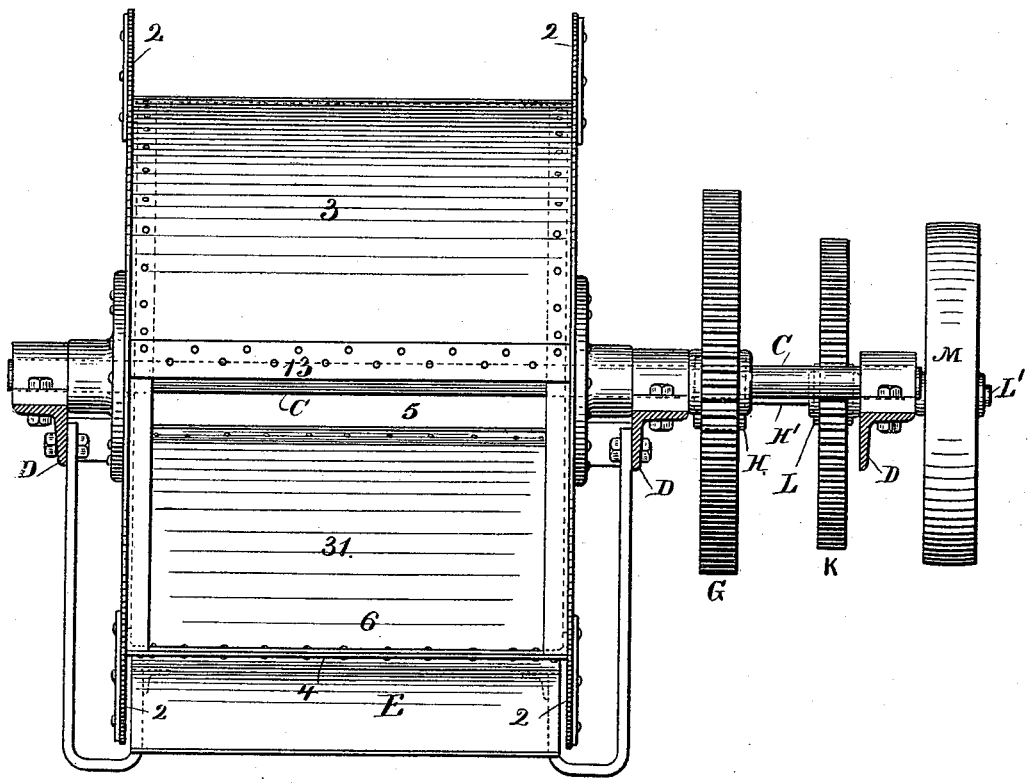

In the drawings, Figure 1 is a vertical section of the rotary measure and the parts connected with the same, and Fig. 2 is an end view of the apparatus.

The material is supplied into a chute or hopper A in any suitable manner, and at the lower end of the same is the rotary measure B, preferably of plate or sheet iron or steel and supported by the axle or shaft C, upon journal-boxes on the side frames D. The rotary measure B is cylindrical, having circular ends 2 and cylindrical segments 3 and 4, and a central partition 5 within and extending from end to end of the rotary measure, and there are spaces 6 and 7 between the cylindrical segments 3 and 4 forming mouths through which the material passes into the chambers or compartments of the rotary measure, and it is preferable to make use of blades or lips 13 of steel and extending along the advancing edges of the respective cylindrical segments 3 and 4. I prefer to employ the circular ends 2 of a much larger diameter than the cylindrical segments 3 4, so as to form annular flanges around the edges of the rotary measure, and the segmental plate E is between these circular ends 2, and is a continuation of the chute or hopper, and the length of this stationary cylindrical segment E is greater than the width of either of the mouths 6 or 7. Hence, as the rotary measure B is revolved in the direction indicated by the arrow, the material that passes from the chute or hopper A goes through one of the mouths, filling up the chamber or compartment, and the lip 13 at the advancing end of the segment 3 or 4, rising up through the coal or other material, lifts the same, and the cylindrical segment that follows forms a stop to prevent the further downward movement of the coal or other material, and before the cylindrical segment passes clear of the upper end of this stationary segment E the lip 13 of the next cylindrical segment has passed over the lower portion of such stationary segment E, and the coal or other material as it runs down passes into the mouth and into the other compartment of the rotary measure, and any material that may be upon the stationary segment E is lifted by the lip 13 and passed into the rotary measure or backward into the chute, and such rotary measure becomes full or sufficiently full by the time it arrives at the position shown in Fig. 1. The contents of the compartments in the rotary measure are discharged successively as the measure is revolved and such materials run out upon a suitable chute or incline or are delivered directly into the coal-breaker, separator, or similar machine. It will be understood that this rotary measure is adapted to such irregular masses as the large lumps of coal passing to the coal-breaker, because such lumps cannot obstruct the movement of the rotary measure even by projecting outwardly at either of the mouths, because the flanges formed by the ends of the cylinder prevent such coal from falling off laterally or becoming wedged or obstructed, and in case there is an accumulation of coal or similar material in the hopper A before the machine is started there will be no overflow, and the compartment of the rotary measure adjacent to such hopper or chute will be filled but little more than the ordinary amount.

Within the compartment of the rotary measure inclined partitions 30 and 31 may be introduced between the central partition 5 and the ends of the cylindrical segments 3 and 4, which inclined partitions 30 31 serve to lessen the capacity of the respective compartments of the rotary measure and at the same time insure the rapid delivery of the material from such compartments, and prevent the same becoming wedged in the corners or angles of such compartments. The partitions 30 and 31 insure the rapid delivery of the coal or other material and prevent the same remaining in the angles between the cylinder and central partition, and the capacity of the receptacles can be varied by placing these partitions in any desired positions without altering the exterior dimensions of the cylinder.

The rotary measure may receive its movement from any suitable mechanism; but I prefer to use a large wheel G upon the shaft C, driven by a pinion H upon a shaft H', upon which is a gear-wheel K, receiving its motion from a pinion L on the shaft L', to which a rotary movement is given by the pulley M, from which a band or belt 35 passes to a pulley upon the shaft of one of the breaker-cylinders N. These breaker-cylinders are to be of any desired character and adapted to soft coal or hard coal. Hence the portion of the cylinders represented at N is only illustrative of any suitable breaking device or separator.

The measure herein described and shown is especially adapted to devices that continuously revolve in one direction; but the operation thereof will be similar if the measure is revolved intermittently or completely, or partially first in one direction and then in the other.

I claim as my invention—

1. The feed-regulator for coal and other material, composed of the circular ends 2 upon the shaft C, the cylindrical segments 3 and 4 between the circular ends and of less diameter than such circular ends, the central partition 5, and the lips 13 upon and projecting beyond the advancing edges of the cylindrical segments, in combination with a supply-chute and the stationary segment E, passing in between the circular ends 2, and being adjacent to the lips 13 and segments 3 and 4, substantially as set forth.

2. A rotary feed-regulator having circular heads and segmental sides and an outwardly-projecting lip upon the advancing edge of the segment, in combination with the feeding-incline and the stationary segment E adjacent to the path described by the lip, substantially as specified.

Signed by me this 28th day of January, 1890.

CHAS. W. HUNT.

Witnesses:
GEO. T. PINCKNEY,
WILLIAM G. MOTT.